United States Patent [19]

Manzi

[11] 3,712,753
[45] Jan. 23, 1973

[54] UNIVERSAL REPLACEABLE DRILL FOR MARBLE, METALS AND WOOD

[76] Inventor: Mathew Manzi, 38-66 13th Street, New York, N.Y. 10009

[22] Filed: July 15, 1971

[21] Appl. No.: 162,875

[52] U.S. Cl. ................408/224, 408/233, 408/239
[51] Int. Cl. .........................B23b 51/00, B23b 51/16
[58] Field of Search......408/199, 223, 224, 225, 231, 408/233, 238, 239; 145/130

[56] References Cited

UNITED STATES PATENTS 2,826,104  3/1958  Morin...................................408/224

Primary Examiner—Francis S. Husar

[57] ABSTRACT

The present disclosure relates to a device forming the combination of two replaceable drills. One drill is meant to cut small holes and another for larger holes. Preferably the device in question may be used to cut holes in marble, stone, steel and wood. The invention provides a special design drill to cut the small holes and tool bit to cut the large holes. Both, the drill and the tool, may be readily removeable and replaceable from the device in question by drill or a tool bit of different size and manufacture.

1 Claim, 8 Drawing Figures

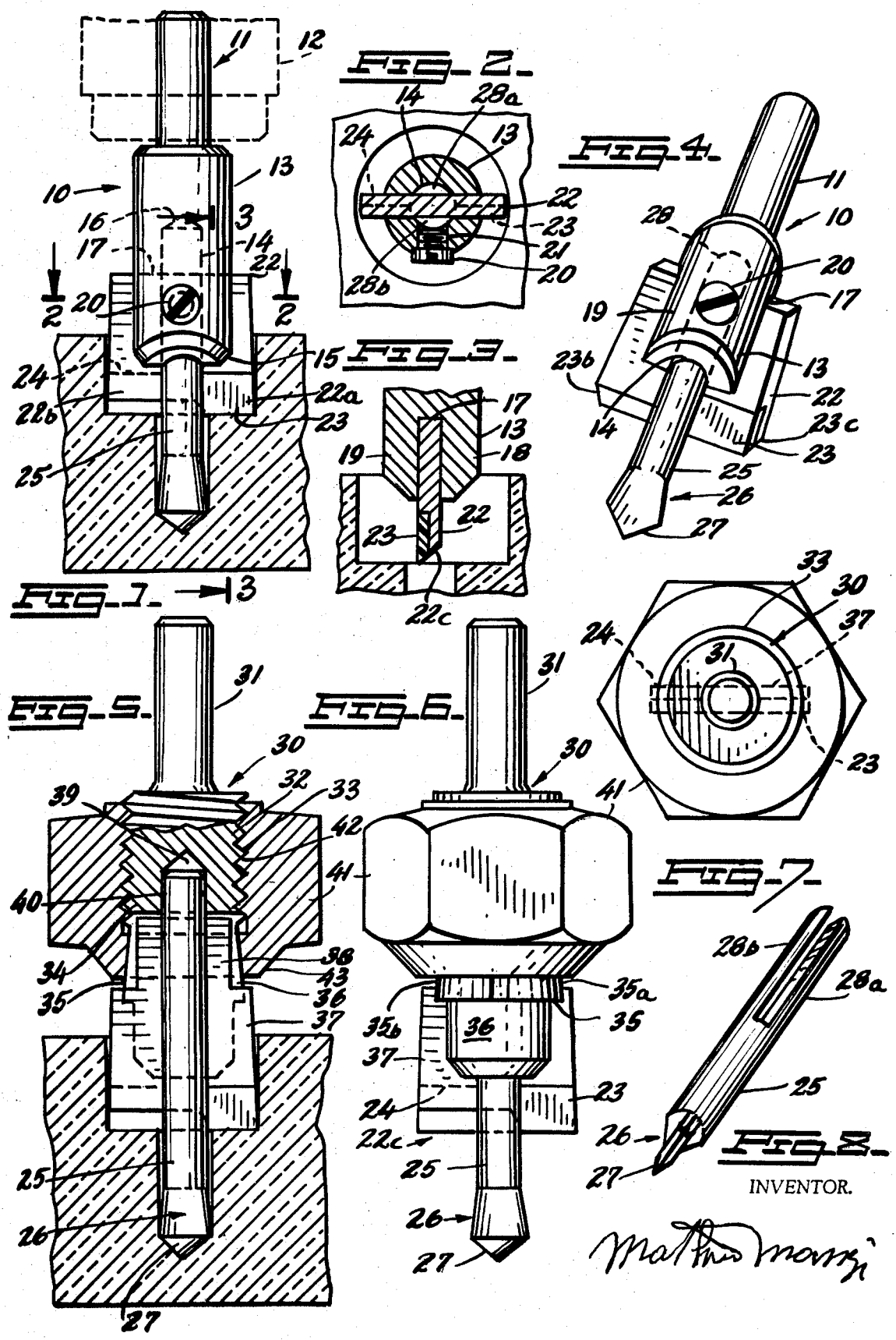

UNIVERSAL REPLACEABLE DRILL FOR MARBLE, METALS AND WOOD

The present invention relates to instruments and devices which may find application in the drill tool industry, and more particularly in tools used primarily to cut and to machine holes in marble, stone, steel wood etc. Especially, however, this invention relates to tools for drilling holes in various sizes in marble blocks and plates in the manufacture of marble table tops, marble shelves, marble wash-basins, marble furniture, buildings, statuary etc.

Preferably marble table tops are manufactured from flat highly polished pieces of marble slabs slightly over one inch thick. For special occasions, however, marble slabs may be thinner (such as in shelves) and very thick (such as in marble masonry). However, it is rather important that in each and every case the machines holes are cut smooth and straight and that the drill tool does not vibrate during the drilling operation to chip the marble. A drill tool of such nature must be also provided with replaceability features. The drill tool here described is generally composed of a drill shank with a means to receive and to hold fast the tool bit or the cutting knife. In such a device the machinist or the stone mason ought to be able (at will) to replace one tool bit for another without the need of removing the drill from the jaws of the drill press.

Preferably the drill tool forming the embodiment of the present invention may comprise, in combination, a drill shank having a rounded extension permitting securing it to the jaws of a power drill. The The cutting end of the tool bit may be formed of a flat piece of steel having soldered or welded thereto a pair of cutting knives of hardened steel. Diamonds, and bits of corborundum also may be used if necessary. To receive the tool bit the drill shank may be provided with a somewhat rectangular cut-out (which is shaped like a two-pronged fork) into which the flat tool bit is mounted. There is also provided in the shank a set screw which is made tight to hold the tool bit secure to the rectangular cut-out aforesaid. However, in a modification, in place of the set screw above referred to there may be provided a machine nut which is made to ride over a left-handed thread which is machined in the drill shank. The lower end of the drill shank has a somewhat tapered or slanted skirt-shaped portion, and the tightening nut rides over said skirt-shaped portion. When the nut is made tight it works against the tapered portion of the drill shank to flex its two-pronged form so as to make the tool bit fast in the shank. To remove the tool bit from the shank the nut is rotated in the opposite direction to free its hold on the tapered skirt-shaped portion to loosen its hold on the tool bit. This action will permit the removal of one tool bit and its replacement with another with little difficulty.

The tool bit and drill of the present invention substantially differs from drill of similar nature in daily use. It is primarily a combination of two drills in one. One drill is for cutting holes in marble up to one half inch in diameter. This drill is cylindrical and at one end thereof it carries a two-pronged cutting end while at the opposite end it has a cross-wise cut-out forming a fork. The second drill is the tool bit already above described. The latter permits the cutting or the drilling of holes in marble up to six inches in diameter. An additional modification will permit cutting holes in flat marble plates of any size, and the shaping of circular table tops. This latter feature will be described and claimed in a separate continuation application to be filed at a later date.

Accordingly, one object of the present invention is to provide a combination tool drill of the class described which will be inexpensive to manufacture, easy to install and safe to operate.

Another object of the present invention is to provide a drill tool of the class described which will feature two separate tool drills; one for smaller holes and another for holes of larger diameter. Both drills being replaceable thus contributing to a greater universality of the embodiment of the present invention.

An additional object of the present invention is to provide a shank to hold a cutting tool, said tool being rectangular in cross-section, a slot machined in said shank to receive said flat tool bit, and means for making fast said tool bit into the shank of the drill.

A further object of the present invention is to provide a tool bit, and means to facilitate the removal of said tool bit. Such means comprising a tightening nut. The rotation of said nut in one direction making the tool bit fast to said shank, while the rotation of the nut in the opposite direction loosening the tool bit from said shank.

Other objects will be seen as the specification will proceed. This invention also consists in certain other features of construction and the combination and arrangement of parts to be hereinafter fully described, illustrated in the accompaning drawing, and in the specifications, and specially pointed out in the appended claims.

In describing the invention in detail, references will be had to the accompanying drawing where like character numerals denote like or corresponding parts throughout the several views in which:

FIG. 1 is a front elevational view of the embodiment of the present invention showing the combination of two drills;

FIG. 2 is a section taken on the line 2—2 of FIG. 1;

FIG. 3 is a section taken on the line 3—3 of FIG. 1 showing the rectangular drill only;

FIG. 4 is a perspective view showing the drill and tool combination;

FIG. 5 is a cross-section through a modification showing the tightening nut with its tightening tapered portion;

FIG. 6 is an exterior view of the modification shown in FIG. 5, and;

FIG. 7 is a top elevational view of FIG. 6.

FIG. 8 is a perspective elevation of the small drill.

It is understood that the present form of disclosure is merely for the purpose of illustration, and that there might be various modifications thereof, without departing from the spirit of the invention as herein set forth.

Referring now more particularly to the present invention, and more specifically to FIG. 1, which shows the best application of my combination drill, it comprises, in the main, the drill shank 10 proper. The shank 10 is provided with a cylindrical extension 11 which is made tight in the claws of the drill press 12, substantially as indicated in dotted lines.

Right under, and directly below the cylindrical extension 11 of the drill shank 10, there is preferably another similar extension 13 of somewhat greater diameter. An opening or a hole 14 is located in the extension 13 and enters it from the front end 15 deep into the shank 10 ending at about the center of the shank, and substantially as shown by the dotted lines 16. From FIG. 1 it can be discerned that in the extension 13 there is machined an elongated rectangular slot 17 and in such a manner as to form a pair of side extensions 18 and 19, respectively (see FIG. 3). There is also provided a set screw 20 which rides in the thread (left hand thread) 21 cut in the cylindrical extension 13. By means of the set screw 20 the tool bit (later to be described in detail) is held fast to the drill shank 10.

Respectively to FIGS. 1, 2 and 3, it can be noted that a rectangular piece of steel 22 may be fitted snugly within the saddle formed by the pair of forked extensions 18 and 19. This is the replaceable tool bit forming the embodiment of the present invention. The latter is preferably rectangular in cross-section and of substantial length. At either lower ends thereof 22a and 22b the piece 22 can be provided with a hardened steel bit 23 and 24, respectively. Either one of the bits 23 and 24 may be soldered or welded to the tool bit 22. The lower ends of the hardened steel bits 22a and 22b are ground to form a knife edge 23c, substantially as shown in FIG. 2.

Reference now being had to FIG. 4, the latter is a perspective front elevational view showing additional pertinent details of my drill combination. It can be discerned that a second drill or tool 25 may be secured to the extension 13, and may be made fast to the drill by means of the set screw 20 above described. The lower end 25 of the drill 23 has a two-pronged cutting edge 27, while its upper end 28 is machined to form a forked member, comprised by the right extension 28a and the left extension 28b (see FIG. 8). The extensions 28a and 28b saddle the tool bit 22 in the same manner the extensions 18 and 19 saddle the tool bit 22 (see FIGS. 1, 2 and 3, respectively).

Referring now more particularly to the modification shown in FIGS. 5, 6 and 7, respectively, it can be seen that the drill shank 30 may be provided with one vertical extension 31 (which when the drill is used is held in the jaws of the drill chuck not shown) and another extension 32. The latter has a left-handed thread cut or machined on its outer circumference. The lower extension 34 of the shank 33 may be provided with a somewhat tapered skirt-shaped extension 35. A rectangular slot or groove 36 is machined in the skirt-shaped section 35 to divide the latter into two separate members 35a and 35b, respectively, so as to form a forked end. Within the slot 36 may be mounted the tool bit 37. The latter is provided with a somewhat narrower upper portion 38. This portion is substantially narrower than the lower portion of the tool bit 37; in fact it is narrower than the outer diameter of the skirt-shaped portion 35 so that the upper end 38 will nor protrude beyond the outer diameter of the skirt-shaped portion 35. A centrally located hole 39 is located in the shank 33. The hole 39 receives the upper extension of the drill 40. Otherwise the overall design and dimensions of the drill 40 is similar to the drill 25 above described in FIGS. 1 to 4, inclusive. In like manner the design of the rectangular tool bit 37 is here the same and as already described above and reassembling the tool bit 22 shown in FIGS. 1, 2, 3 and 4, respectively.

A tightening nut 41 having an internal thread 42 may be mounted over the thread 33, in the shank 32, and can be made to rotate (by means of a wrench) in a clockwise or counter-clockwise direction depending on the purpose intended. The lower end 43 of the tightening nut 41 fits snugly over the skirt-shaped portion 35 and the shank 33. When the nut 41 is rotated in a counter-clockwise direction it will compress the skirt-shaped extensions 35a and 35b in the shank 32 to make the drill 40, and the tool bit 37, tight and fast to the shank 32. When the nut 41 is rotated in a clockwise direction, it will loosen its grip on the skirt-shaped sections and the members 35a and 35b and thus it will permit the removal of the drill 40 and the tool bit 37 from the shank 32 for replacement purposes or for the purposes of regrinding.

A careful examination of the foregoing description in conjunction with the invention as illustrated in the drawing, will enable the reader to obtain a clear understanding and impression of the alleged features of merit and novelty, sufficient to clarify the construction of the invention as hereinafter claimed.

Minor changes in shape, size and materials, and rearrangement of parts, may be resorted to in actual practice, as long as no departure is made from the invention claimed.

Having described my invention, what I claim is the following:

1. In a device of the class described for drilling holes in marble slabs, including, in combination, two separate drills, one of said drills for drilling holes of smaller diameter and the other of said drills for drilling holes of substantially larger diameter, a drill shank to support said drills, said one of said drills having a forked shaped extension at one end thereof, said other of said drills comprising a flat tool bit with cutting edges, a rectangular slot located in said shank, said flat tool bit fitting snugly within the slot in said shank, said forked extension in said one of said drills saddling the flat tool bit and being anchored within a hole in said shank, and a set screw means to make both the tool bit and said drill tight and fast to said drill shank.

* * * * *